(12) United States Patent
Lohr

(10) Patent No.: US 8,631,574 B2
(45) Date of Patent: Jan. 21, 2014

(54) METHOD FOR MOLDING PRODUCTS ADAPTED FOR USE IN DIFFERENT APPLICATIONS

(75) Inventor: John Carl Lohr, Beverly Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1033 days.

(21) Appl. No.: 12/481,596

(22) Filed: Jun. 10, 2009

(65) Prior Publication Data

US 2010/0313421 A1 Dec. 16, 2010

(51) Int. Cl.
*B23P 15/10* (2006.01)

(52) U.S. Cl.
USPC .................................. 29/888.042

(58) Field of Classification Search
USPC .................................. 29/888.042
See application file for complete search history.

(56) References Cited

U.S. PATENT DOCUMENTS

| | | |
|---|---|---|
| 3,326,196 A | 6/1967 | Kaufman |
| 4,785,951 A | 11/1988 | Bennett |
| 4,813,394 A | 3/1989 | Clair |
| 5,000,138 A | 3/1991 | Bennett |
| 5,248,071 A | 9/1993 | Ray |
| 6,814,032 B2 | 11/2004 | Goto |
| 7,069,920 B2 | 7/2006 | Gamberini et al. |
| 2009/0194904 A1* | 8/2009 | Logel et al. .......... 264/250 |

* cited by examiner

*Primary Examiner* — David Bryant
*Assistant Examiner* — Moshe Wilensky
(74) *Attorney, Agent, or Firm* — Julia Voutyras; Allenman Hall McCoy Russell & Tuttle LLP

(57) ABSTRACT

A method is provided for forming intake manifolds for an internal combustion engine and for fastening such manifolds to the engines. The method includes: molding a plurality of identical ones of the intake manifolds, each one of the intake manifolds being molded with at least one hollow projection extending outwardly from an outer surface of the manifold, each one of the projections being molded with a cap at the distal end to seal the distal end of the hollow projection; removing the cap at a selected one or ones of the projections while leaving the cap on unselected one or ones of the projections; fastening each one of the intake manifolds to a corresponding one of a plurality of internal combustion engines; and for each one of the fastened intake manifolds, attaching a hose or hoses to the distal end or ends of the selected one or ones of the plurality of projections.

3 Claims, 4 Drawing Sheets

METHOD FOR MOLDING PRODUCTS ADAPTED FOR USE IN DIFFERENT APPLICATIONS

TECHNICAL FIELD

This disclosure relates generally to methods for molding products and more particularly to methods for molding products for different applications. Still more particularly, the disclosure relates to methods for molding intake manifolds for internal combustion engines.

BACKGROUND

As is known in the art, one element used in an internal combustion engine is an intake manifold. Many intake manifolds are molded and some are molded with vacuum spigots. However, while a vacuum spigot may be required for the intake manifold used on one vehicle, a vacuum spigot may not be required on a different engine using the same basic intake manifold footprint. Still further, one manifold for the engine any have a different number or arrangement of spigots that another. Thus, for example, the intake manifold for one engine may have one spigot while the intake manifold for another engine many have two spigots, and so forth. Typically an extra cap is required to plug the vacuum spigot not being used. Same issue for a fuel delivery line like Compressed Natural Gas (CNG). This adds cost to the vehicle not needing the extra vacuum spigot.

SUMMARY

In accordance with the present disclosure, a method is provided for forming a molded structure. The method includes: molding a plurality of identical ones of the molded structures, each one of the molded structures being formed with at least one hollow projection extending outwardly from an outer surface of the structure, the projection being molded with a cap at a distal end of the projection to seal the distal end of the hollow projection; removing the cap from the projection of a first portion of the molded structures while leaving the cap on the projection on a second portion of the molded structures; and attaching a hose to the distal end of the first portion of the structures.

In one embodiment, a method is provided for forming intake manifolds for an internal combustion engine and for fastening such manifolds to the engines. The method includes: molding a plurality of identical ones of the intake manifolds, each one of the intake manifolds being molded with at least one hollow projection extending outwardly from an outer surface of the manifold, each one of the projections being molded with a cap at the distal end to seal the distal end of the hollow projection; removing the cap at a selected one or ones of the projections while leaving the cap on unselected one or ones of the projections; fastening each one of the intake manifolds to a corresponding one of a plurality of internal combustion engines; and for each one of the fastened intake manifolds, attaching a hose or hoses to the distal end or ends of the selected one or ones of the plurality of projections, Thus, the disclosure integrates the permanent cap into the intake manifold. A breakaway feature, or cap, is added to the end of the hollow projection (e.g. spigot or boss) that can be broken off with simple tools.

In one embodiment, at least two of the manifolds are adapted for mounting to different types of the internal combustion engines, and wherein caps of one of the fastened manifolds are removed from different projections than those removed from the other one of the fastened manifolds.

In one embodiment, a method is provided for forming intake manifolds for an internal combustion engine and for fastening such manifolds to the engines. The method includes: molding a plurality of identical ones of the intake manifolds, each one of the intake manifolds being molded with at least one hollow projection extending outwardly from an outer surface of the manifold, each one of the projections being molded with a cap at the distal end to seal the distal end of the hollow projection; removing the cap or caps from the projections of a first portion of the molded intake manifolds while leaving the cap or caps on the projections of unselected one or ones of the projections of the first portion of the intake manifolds and removing the cap or caps from the projections from a second portion of the molded intake manifolds; fastening each one of the intake manifolds to a corresponding one of a plurality of internal combustion engines; and for each one of the fastened intake manifolds, attaching a hose or hoses to the distal end or ends of the projections of the first portion of the manifolds.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1A:
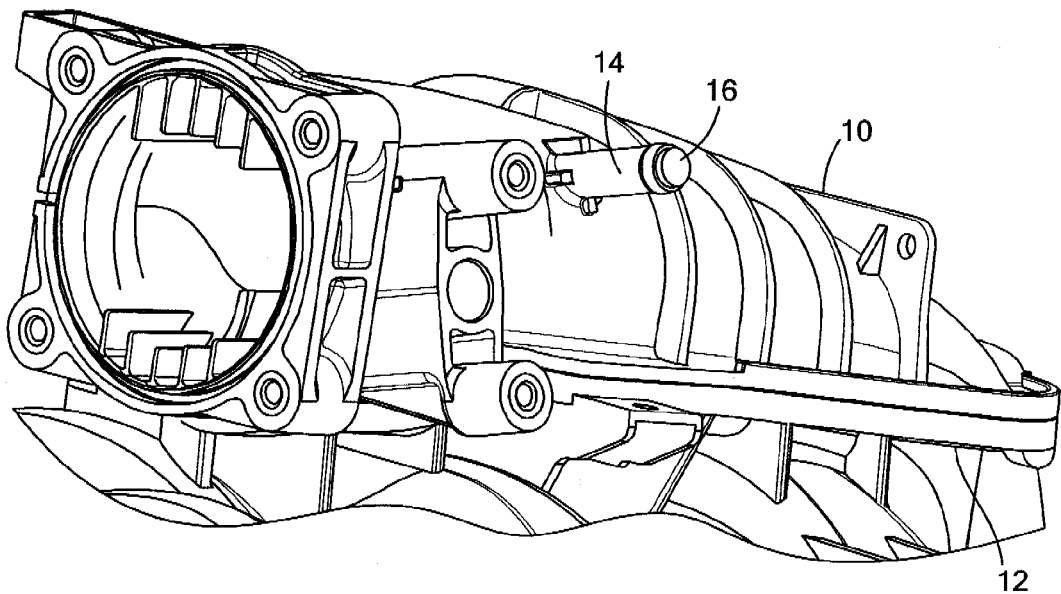
FIG. 1A is a sketch of an internal combustion engine intake manifold molded in accordance with the disclosure and attached to the internal combustion engine in accordance with the disclosure.
Figure 1B:
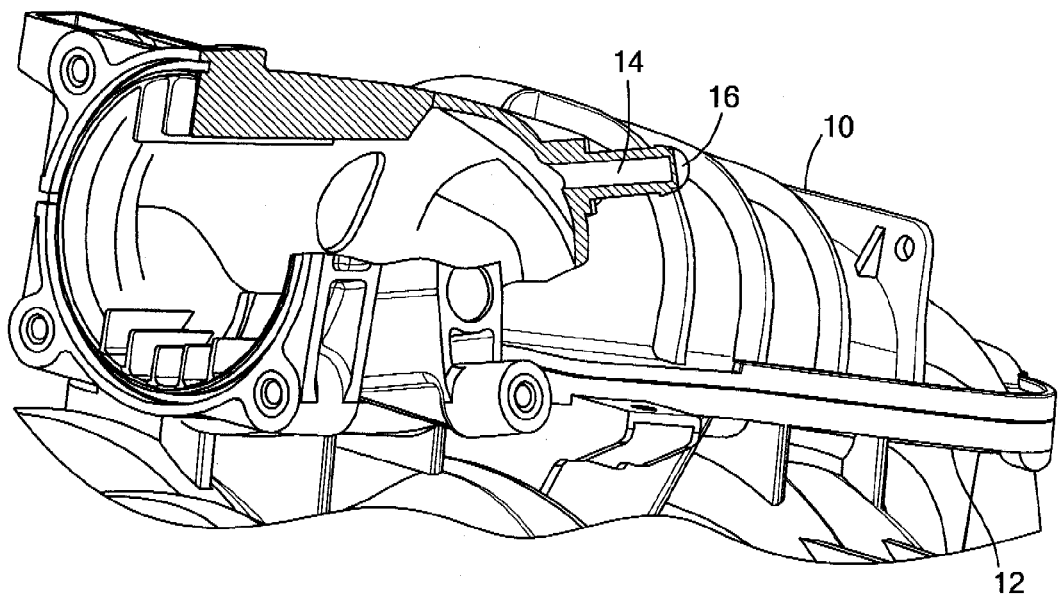
FIG. 1B is a cross sectional view of a portion of the internal combustion engine intake manifold of FIG. 1A, such cross section being taken through a vacuum spigot molded with the manifold in accordance with the disclosure.

Referring now to FIGS. 1A, 1B 2A and 2C, a method is provided for forming a molded structure; here the intake manifold 10 of an internal combustion engine 12. The method includes: molding a plurality of identical ones of the molded structures, here the intake manifold 10, each one of the molded structures 10 being formed with at least one hollow projection 14, here for example one vacuum spigot, extending outwardly from an outer surface of the structure 10, the projection 14 being molded with a cap 16 at a distal end of the projection 14 to seal the distal end of the hollow projection 14.

It is noted that the molded structure 10 may be used with different ones of the engine 12; some engines requiring the vacuum spigots 14 and others not requiring the vacuum spigot 14.

Figure 2A:
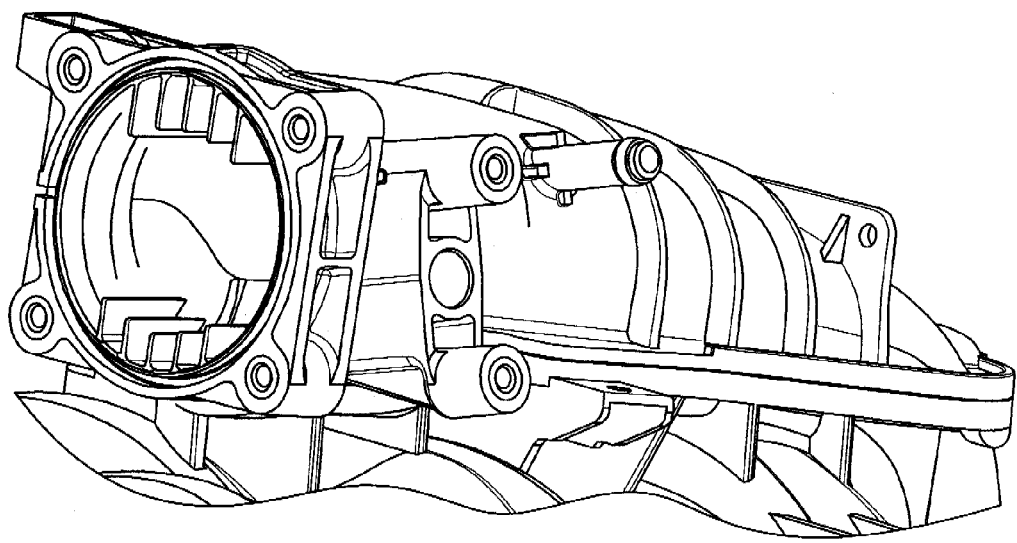
FIG. 2A is a sketch of the internal combustion engine intake manifold of FIG. 1A after a cap molded at a distal end of the vacuum spigot has been clipped off in accordance with the disclosure.
Figure 2B:
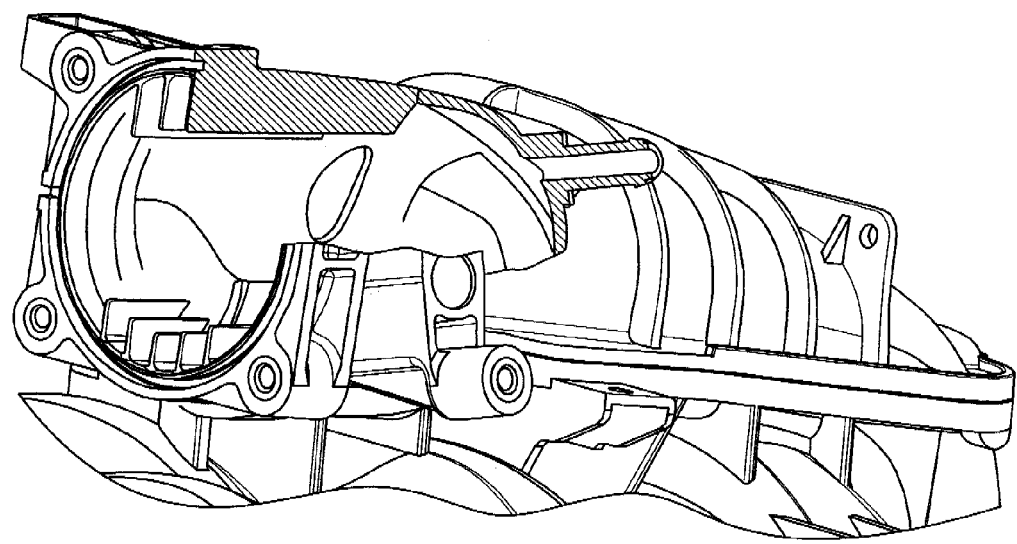
FIG. 2B is a cross sectional view of a portion of the internal combustion engine intake manifold of FIG. 2A, such cross section being taken through a vacuum spigot molded with the manifold after the a cap molded at a distal end of the vacuum spigot has been clipped off in accordance with the disclosure.
Figure 3:
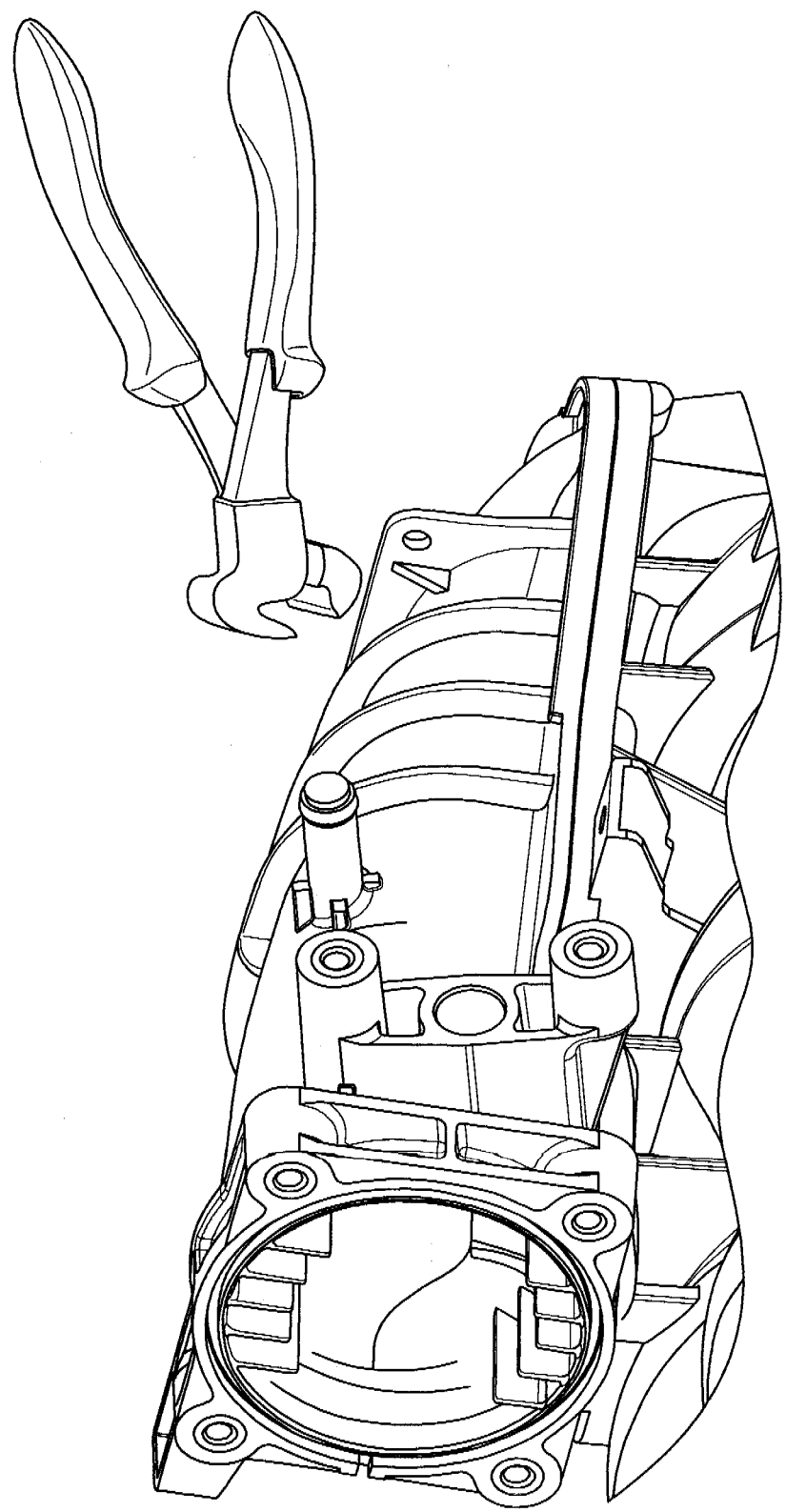
FIG. 3 is a sketch illustrating a method for clipping off the cap of the vacuum spigot of the manifold of FIG. 1A.

Thus, the for those engines requiring the spigots, the process includes removing the cap 16 from the projection 14, as shown for FIGS. 2A and 2B; here by sniping the cap 14 as shown in FIG. 3 while the cap 16 remains on those intake manifolds to be mounted to engines not requiring vacuum spigots.

Thus, in accordance with the disclosure, the caps 16 are removed a first portion of the molded structures (i.e., those to be mounted to engines requiring spigots) while leaving the cap on the projection on a second portion of the molded structures (i.e., those to be mounted to engines not requiring spigots).

Figure 4:
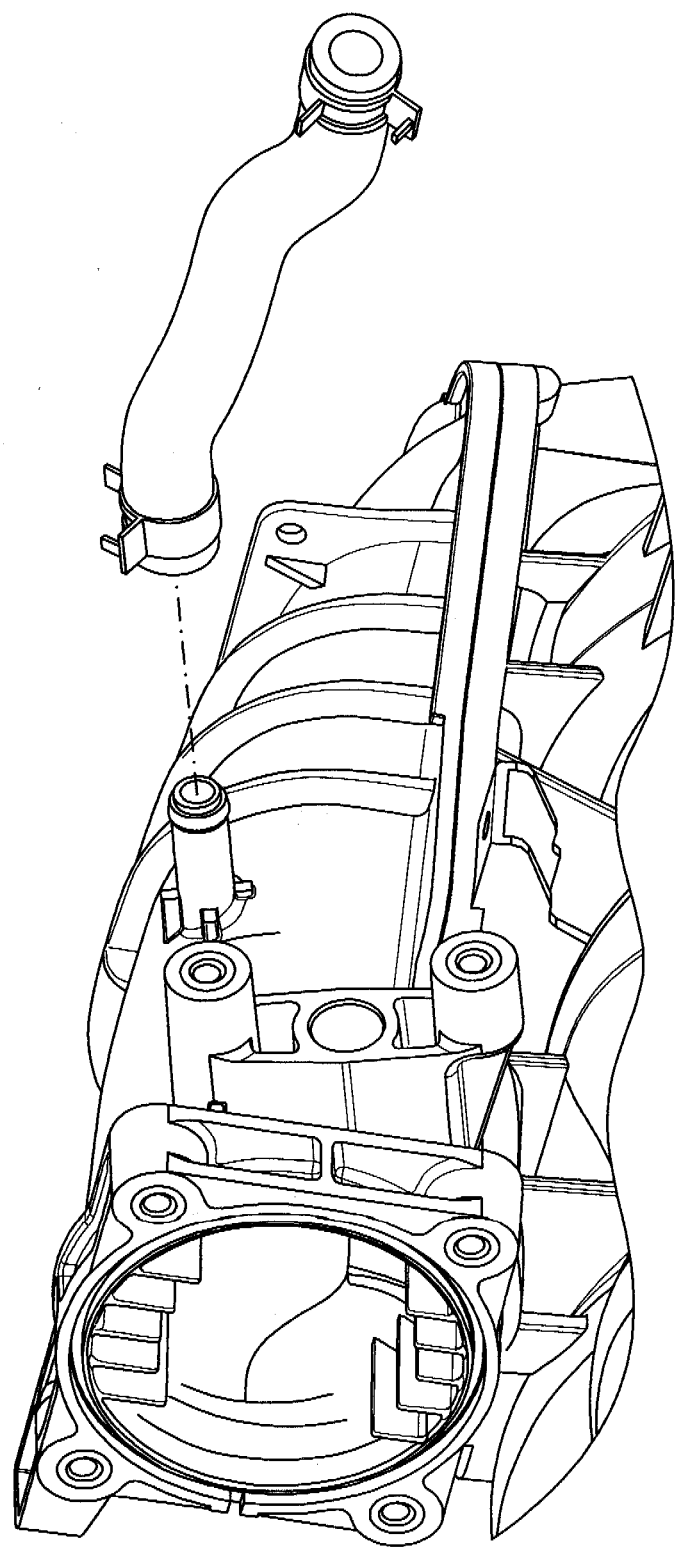
FIG. 4 is a sketch illustrating a method for attaching a hose to the vacuum spigot after the cap has been snipped off of the manifold of FIG. 1A.

Next, after snipping the cap as illustrated in FIGS. 2A and 2B, a hose 20 is fastened to the open-ended (i.e., cap removed) spigot 14 as shown in FIG. 4.

Thus, in accordance with the disclosure, a method is provided for forming intake manifolds for an internal combustion engine and for fastening such manifolds to the engines. The method includes: molding a plurality of identical ones of the intake manifolds, each one of the intake manifolds being molded with at least one hollow projection extending outwardly from an outer surface of the manifold, each one of the projections being molded with a cap at the distal end to seal the distal end of the hollow projection; removing the cap at a selected one or ones of the projections while leaving the cap on unselected one or ones of the projections; fastening each one of the intake manifolds to a corresponding one of a plurality of internal combustion engines; and for each one of the fastened intake manifolds, attaching a hose or hoses to the distal end or ends of the selected one or ones of the plurality of projections. Thus, at least two of the manifolds are adapted for mounting to different types of the internal combustion engines, and wherein caps of one of the fastened manifolds are removed from different projections than those removed from the other one of the fastened manifolds.

Thus, the disclosure integrates the permanent cap into the intake manifold. A breakaway feature, or cap, is added to the end of the hollow projection (e.g. spigot or boss) that can be broken off with simple tools.

More particularly, a method is provided for forming intake manifolds for an internal combustion engine and for fastening such manifolds to the engines. The method includes: molding a plurality of identical ones of the intake manifolds, each one of the intake manifolds being molded with at least one hollow projection extending outwardly from an outer surface of the manifold, each one of the projections being molded with a cap at the distal end to seal the distal end of the hollow projection; removing the cap or caps from the projections of a first portion of the molded intake manifolds while leaving the cap or caps on the projections of unselected one or ones of the projections of the first portion of the intake manifolds and removing the cap or caps from the projections from a second portion of the molded intake manifolds; fastening each one of the intake manifolds to a corresponding one of a plurality of internal combustion engines; and for each one of the fastened intake manifolds, attaching a hose or hoses to the distal end or ends of the projections of the first portion of the manifolds.

In one embodiment, the intake manifold material is typically: Nylon 6 30% glass filled or Nylon 66 30% glass filled or, for example, Nylon 6 50% glass filled. In one embodiment, the spigot dimensions are: Diameter: 1/4", 3/8", 1/2", 5/8" outside diameter; Length: 20 to 30 mm; Thickness: 2.5 mm to 3.5 mm; end cap thickness: 0.75 mm to 2.0 mm. While any simple tool can be used to manually snip the cap, it can be removed robotically. Thus, a number of embodiments of the disclosure have been described. Nevertheless, it will be understood that various modifications may be made without departing from the spirit and scope of the disclosure. For example, while typically the cap is clipped after the manifold is mounted to the engine, the cap may be clipped before the manifold is mounted to the engine. Accordingly, other embodiments are within the scope of the following claims.

What is claimed is:

1. A method for forming intake manifolds for internal combustion engines and for fastening such manifolds to the engines, comprising:
   molding a plurality of identical intake manifolds, each one of the intake manifolds being molded with at least one hollow spigot extending outwardly from an outer surface of each one of the manifolds, each one of the spigots being molded with a break-off cap region at the distal end to seal the distal end of the hollow spigot;
   permanently breaking away the break-off cap region at a selected one or ones of the spigots while leaving the cap on unselected one or ones of the spigots;
   fastening each one of the intake manifolds to a corresponding one of a plurality of internal combustion engines; and
   for each one of the fastened intake manifolds, attaching a hose or hoses to the distal end or ends of the selected one or ones of the plurality of spigots.

2. The method recited in claim 1 wherein at least two of the manifolds are adapted for mounting to different types of the internal combustion engines, and wherein the brake-off cap regions of one of the fastened manifolds are removed from different spigots than those removed from the other one of the fastened manifolds.

3. A method for forming intake manifolds for internal combustion engines and for fastening such manifolds to the engines, comprising:
   molding a plurality of identical intake manifolds, each one of the intake manifolds being molded with at least one hollow spigot extending outwardly from an outer surface of such one of the intake manifold, each one of the spigots being molded with a break-off cap regions at the distal end to seal the distal end of the hollow spigot;
   permanently removing the break-off cap region or brake-off cap regions from the spigots of a first portion of the molded intake manifolds while leaving the break-off cap region or break-off cap regions on the spigots of unselected one or ones of the spigots of the first portion of the intake manifolds and removing the break-off cap region or break-off cap regions from the spigots projections from a second portion of the molded intake manifolds;
   before or after said removing of the break-off cap region or brake-off cap regions, fastening each one of the intake manifolds to a corresponding one of a plurality of different types of internal combustion engines; and
   for each one of the fastened intake manifolds, attaching a hose or hoses to the distal end or ends of the spigots of the first portion of the manifolds.

* * * * *